United States Patent
Loeffler

(10) Patent No.: US 6,849,029 B2
(45) Date of Patent: Feb. 1, 2005

(54) METHOD AND OPERATOR CONTROL SYSTEM FOR CONTROLLING THE TRAILING THROTTLE OF AUTOMOTIVE DRIVES

(75) Inventor: Juergen Loeffler, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/316,670

(22) Filed: Dec. 11, 2002

(65) Prior Publication Data

US 2003/0119626 A1 Jun. 26, 2003

(30) Foreign Application Priority Data

Dec. 11, 2001 (DE) .......................................... 101 60 819

(51) Int. Cl.[7] .............................................. B60K 41/04
(52) U.S. Cl. ...................................................... 477/107
(58) Field of Search ................................ 477/107, 110, 477/97, 118, 119; 701/55, 56; 71/55, 56

(56) References Cited

U.S. PATENT DOCUMENTS 6,059,686 A    5/2000   Takahashi

FOREIGN PATENT DOCUMENTS

| DE | 695 11 944 | 5/2000 |
|---|---|---|
| JP | 11 230 322 | 8/1999 |

*Primary Examiner*—Dirk Wright
(74) *Attorney, Agent, or Firm*—Kenyon & Kenyon

(57) ABSTRACT

Given a method for controlling the trailing throttle of automotive drives, in which, assuming an automatic transmission whose control is equipped with various shift programs, the specific shift program being selected automatically as a function of the actuation of the accelerator and the transmission being in operative connection with a selector lever to be operated by the driver, for the selection of factors influencing the drag torque of the automotive drive and therefore for the drivetrain control or transmission-shift control, a specific range of a drag torque is assigned an operating mode, in which, after the system start-up and the setting of the selector lever in the permanent position for forward gear D, steps for controlling the drivetrain or the transmission are carried out individually or in combination, in each case according to the drag torque demanded, but also according to the coasting operation.

12 Claims, 2 Drawing Sheets

METHOD AND OPERATOR CONTROL SYSTEM FOR CONTROLLING THE TRAILING THROTTLE OF AUTOMOTIVE DRIVES

FIELD OF THE INVENTION

The present invention relates to a method for controlling the trailing throttle of automotive drives, in which, starting from an automatic transmission whose control is equipped with various shift programs—the specific program being selected automatically as a function of the actuation of the accelerator—the transmission is in operative connection with a selector lever to be operated by the driver; the invention also relates to an operator control system for activating the control of the trailing throttle for the purpose of carrying out the method.

BACKGROUND INFORMATION

For vehicles, electronic transmission-shift controls and drivetrain controls may be used for the control of the internal combustion engine, of couplings and converters of the drivetrain and of the internal combustion engine. In conjunction with a selector lever guided in a gearshift lever gutter disposed in a center console, these systems permit selection of the driving mode by the driver. In this context, the positions P for parking, R for reverse gear, N for neutral-idling position and D for the permanent position for forward gear, as well as, for example, the gear positions 4, 3, 2 and 1 for a five-speed transmission are available to the driver for the position of the selector lever. However, some designs of transmission-shift controls, thus the Tip-/Steptronic, also permit direct selection of a gear.

In such systems, if the driver leaves the accelerator unactuated when the vehicle is in motion, then overrun sets in, so that the drive applies at the wheels a torque counteracting the vehicle movement. For instance, the drag torque resulting therefrom is desired when the vehicle should be braked during downhill driving. However, it is disadvantageous that the drag torque leads to increased fuel consumption, since the energy received from the drivetrain in overrun is dissipated.

It is possible to avoid these losses by a coasting operation which is achieved, for example, by disengaging an automatic clutch. According to one design, with the accelerator unactuated, the clutch is disengaged in response to the selection of an ECO shift program using a switch in the cockpit. However, this design approach again has the disadvantage that the use of the coasting operation cannot be controlled by the driver according to the requirements, since this operating mode can only be selected by the driver in connection with a particularly economical shift program.

SUMMARY OF THE INVENTION

The present invention provides a method for controlling the trailing throttle of automotive drives, as well as an operator control system for activating the control of the trailing throttle for the purpose of carrying out this method, in which both by the method and by the operator control system, not only the drag torque needed in each case, but also the coasting operation may be selected and thus controlled safely and comfortably by the driver, so that losses are also lowered at the same time by reducing the fuel consumption.

These advantages are achieved by a method, in which, for the selection of factors influencing the drag torque of the automotive drive and thus for the drivetrain control or transmission-shift control, a specific range of a drag torque is assigned an operating mode, in which, after the system start-up and the setting of the selector lever in the permanent position for forward gear D, steps for controlling the drivetrain or the transmission are performed individually or in combination in each case according to the drag torque demanded, but also according to the coasting operation. In this context, for the selection of factors influencing the drag torque, but also the coasting operation, an operating mode with increased drag torque B for "brake", an operating mode with low drag torque C for "cruise" and an operating mode for coasting operation S for "surf" are provided, in which, upon their activation by the driver in the permanent position for forward gear D of the selector lever, steps are performed for controlling the drivetrain or the transmission.

Starting therefrom, in the operating mode with increased drag torque B, the following steps are performed individually or in combination when it is activated:

(a) feeding of electrical energy into the vehicle electrical system and/or into the battery by one or more electric machines which are connected to the drive of the vehicle;

(b) changing the valve timing in systems for electronic valve timing of the internal combustion engine to increase the drag torque; and (c) switch-in of auxiliary systems, thus, the air-conditioner compressor.

If the operating mode with increased drag torque B is used for vehicles having continuously variable transmission (CVT), then operating mode B additionally permits an adjustment of a small conversion ratio upon its activation. For vehicles with variable cylinder number, using the operating mode with increased drag torque B, cylinders of the internal combustion engine may additionally be switched in when operating mode B is activated.

If, in the method of the present invention, the operating mode having low drag torque C is activated, then the following steps for controlling the drivetrain or the transmission are performed individually or in combination:

(a) setting of a high gear for manually shifted transmissions, or a large conversion ratio for vehicles having CVT;

(b) partial decoupling of the internal combustion engine from the output when working with a dual-electro transmission by suitable adjustment of the support torque of the electric machines;

(c) changing the valve timing in systems for electronic valve timing of the internal combustion engine to reduce the drag torque; and (d) shutdown of auxiliary systems, thus, the air-conditioner compressor.

If the operating mode with low drag torque C is used for vehicles having variable cylinder number, then using this operating mode, upon an activation, cylinders of the internal combustion engine may additionally be deactivated as a further step for the control.

Finally, if, in the method of the present invention, the operating mode for coasting operation S is activated, then the following steps for controlling the drivetrain or the transmission are performed individually or in combination:

(a) deselection of the gear or disengagement of the clutch for vehicles having an automatic multi-speed gearbox or ASG;

(b) complete decoupling of the internal combustion engine from the output when working with a dual-electro transmission by suitable adjustment of the support torque of the electric machines;

(c) switching off the internal combustion engine;

(d) changing the valve timing in systems for electronic valve timing of the internal combustion engine to reduce the drag torque; and (e) shutdown of auxiliary systems, thus, the air-conditioner compressor.

For the purpose of initiating the implementation of the method, the specific operating mode with increased drag torque B, with low drag torque C or else for coasting operation S is selected by the driver, for example by using an electronic selector lever or using a rocker key or touch key. However, the occurrence of the effects intended by the present invention is not tied exclusively to these variants. Thus, the respective operating mode B, C or S may be selected, for example, by a speech input by the driver, as well.

In a further refinement of the method according to the invention, for the selection of the respective operating mode B, C or S in the permanent position for forward gear D, the performance of two actions x and y is made possible to the driver upon actuation of the electronic selector lever or the rocker or touch key, of which each action x or y is used at least for activating one operating mode B, C or S. In this context, upon performance of one of the actions x or y twice, a further operating mode of operating modes B, C or S may be activated. Thus, for example, operating mode C may be activated by action y, and operating mode S may be activated by a further action y. If a transition from operating mode S to operating mode C, or from operating mode C to the permanent position for forward gear D is to be performed, the activation necessary for that purpose is effected by action x. Alternatively, however, this is also possible by activating the service brake, but also in cooperation with the activation by action x.

However, upon performance of one of the actions x or y, a limiting of one of the gears 4, 3, 2, 1—here specific to a five-speed transmission as example—may also be implemented, and specifically when the vehicle is not in overrun. In this instance, the transition from the permanent position for forward gear D to one of the gears 4, 3, 2, 1 is effected by action x. However, if the vehicle is in overrun, then action x brings about a transition to the operating mode having increased drag torque B.

In order, in cooperation with the method according to the invention, to achieve the effects intended by it, the present invention also provides for an operator control system, in which the selector lever guided in the gearshift lever gutter is an electronic selector lever, which in the permanent position for forward gear D, by forming two opposite bulges adjacent to the gearshift lever gutter, is able to be tipped in the direction of these bulges in such a way that, in response to the tipping, in each case one of the actions x or y is executable for the purpose of activating one of the operating modes B, C or S. Alternatively, assuming an electronic selector lever, it may also be in operative connection with a rocker key that is provided with an automatic reset, and by which in each case one of the actions x or y is executable for the purpose of activating one of the operating modes B, C or S.

If a touch key is used for the purpose of performing actions x or y, it may be disposed on the steering wheel of the vehicle, which does not rule out the possibility of situating it at another location if it may be reached comfortably and does not impair the control of the vehicle.

So that the driver of the vehicle may receive the necessary information about the respective selected operating mode B,
C or S at any time, the operating modes are displayed by a display instrument which may be disposed in the cockpit of the vehicle.

The operator control system of the present invention, and with it, the method of the present invention, are usable not only for conventional drives, but also for hybrid drives which, in addition to the internal combustion engine, have one or more electric machines in the drivetrain, as well as for vehicles having a dual-electro transmission.

BRIEF DESCRIPTION OF THE DRAWINGS

FIG. 4 shows the steps of the exemplary method of the present invention.

DETAILED DESCRIPTION

Figure 1:
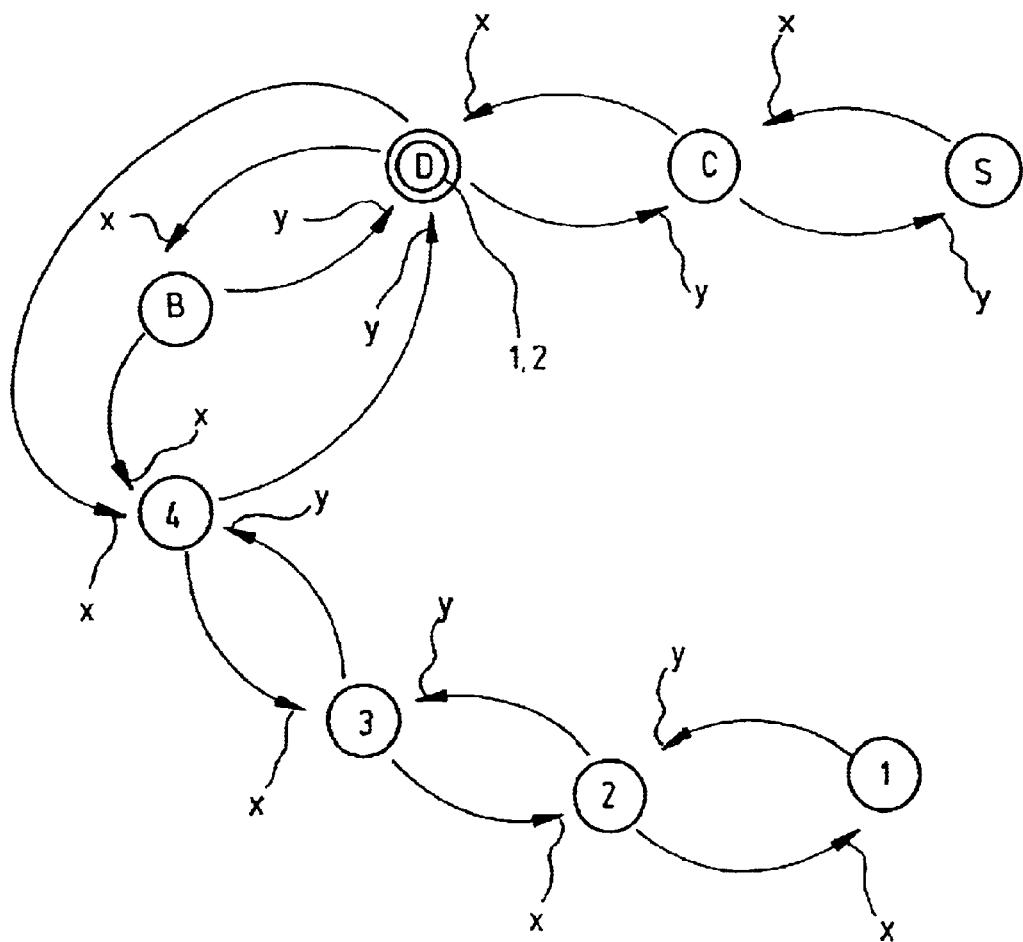
FIG. 1 is a state diagram with respect to the control of the trailing throttle of automotive drives.

According to the state diagram in FIG. 1, it is assumed that, for the selection of factors influencing the drag torque, but also the coasting operation, an operating mode with increased drag torque B, an operating mode with low drag torque C and an operating mode for coasting operation S are provided. Assuming an automatic transmission which has a control that is equipped with various shift programs and which is in operative connection with a selector lever 1 that is an electronic selector lever 2 and is to be operated by the driver—see also FIGS. 2 and 3—this state diagram also takes into account the position of electronic selector lever 2 in the permanent position for forward gear D. The gear positions 4, 3, 2, 1, specific to a five-speed transmission, available to the driver for the positions of electronic selector lever 2 are likewise illustrated. If, after the system start-up, electronic selector lever 2 is in the permanent position for forward gear D, then the operating mode B, C or S necessary in each case may be selected by the driver via electronic selector lever 2. To that end, it is necessary to activate operating modes B, C or S.

Figure 2:
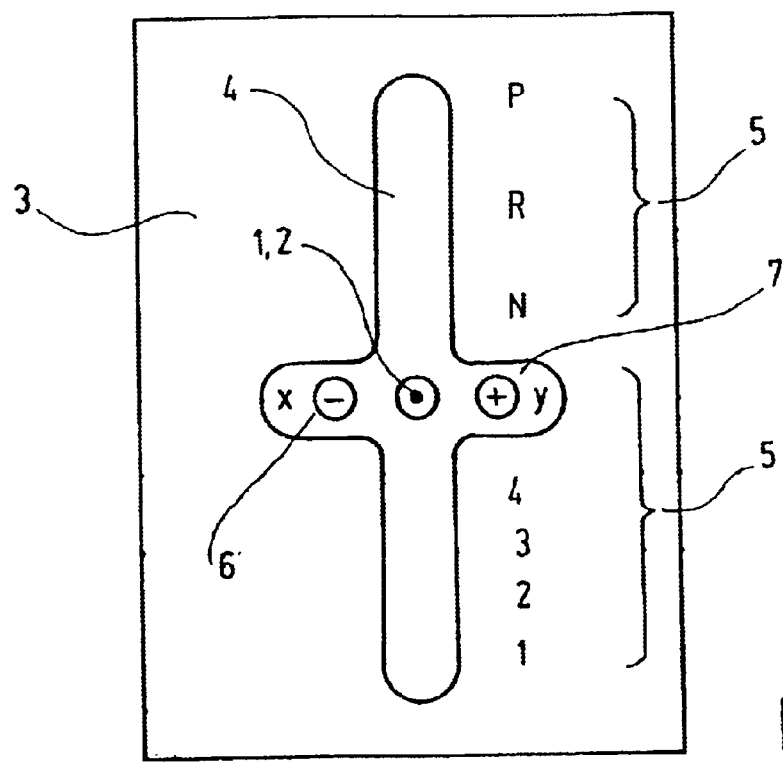
FIG. 2 is an operator control system for activating the control according to FIG. 1.

FIG. 2 illustrates an operator control system for activating operating modes B, C and S according to FIG. 1, and thus for controlling the trailing throttle of automotive drives. The starting point is a gearshift lever gutter 4, arranged in a center console 3, in which selector lever 1, constructed as electronic selector lever 2, is guided, and after selection by the driver, is able to assume one of the positions P, R, N or D, or one of the gear positions 4, 3, 2 or 1 according to shift-position indicator 5. The position of electronic selector lever 2 is illustrated in the permanent position for forward gear D, so that the prerequisites are fulfilled permitting activation of operating modes B, C or S according to FIG. 1. However, to make this possible, gearshift lever gutter 4, in the area in which electronic selector lever 2 is in the permanent position for forward gear D, is provided with two opposite bulges 6, 7, so that electronic selector lever 2 is able to be tipped in the direction of these bulges 6, 7. Upon tipping electronic selector lever 2 in a specific direction, in each case one of the actions x or y is executable for the purpose of activating one of operating modes B, C or S.

Figure 3:
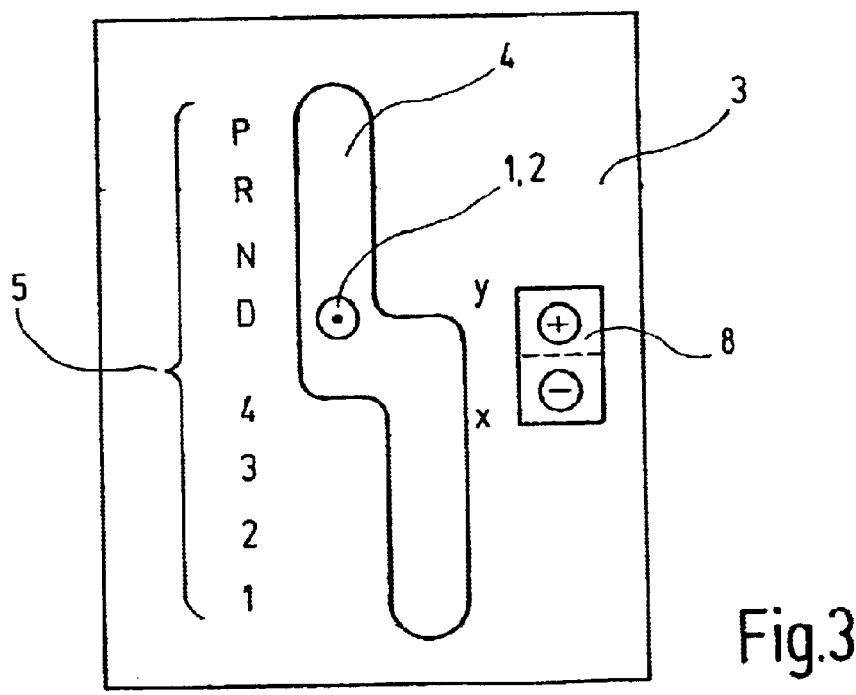
FIG. 3 is a further variant of an operator control system for activating the control according to FIG. 1.
Figure 1:
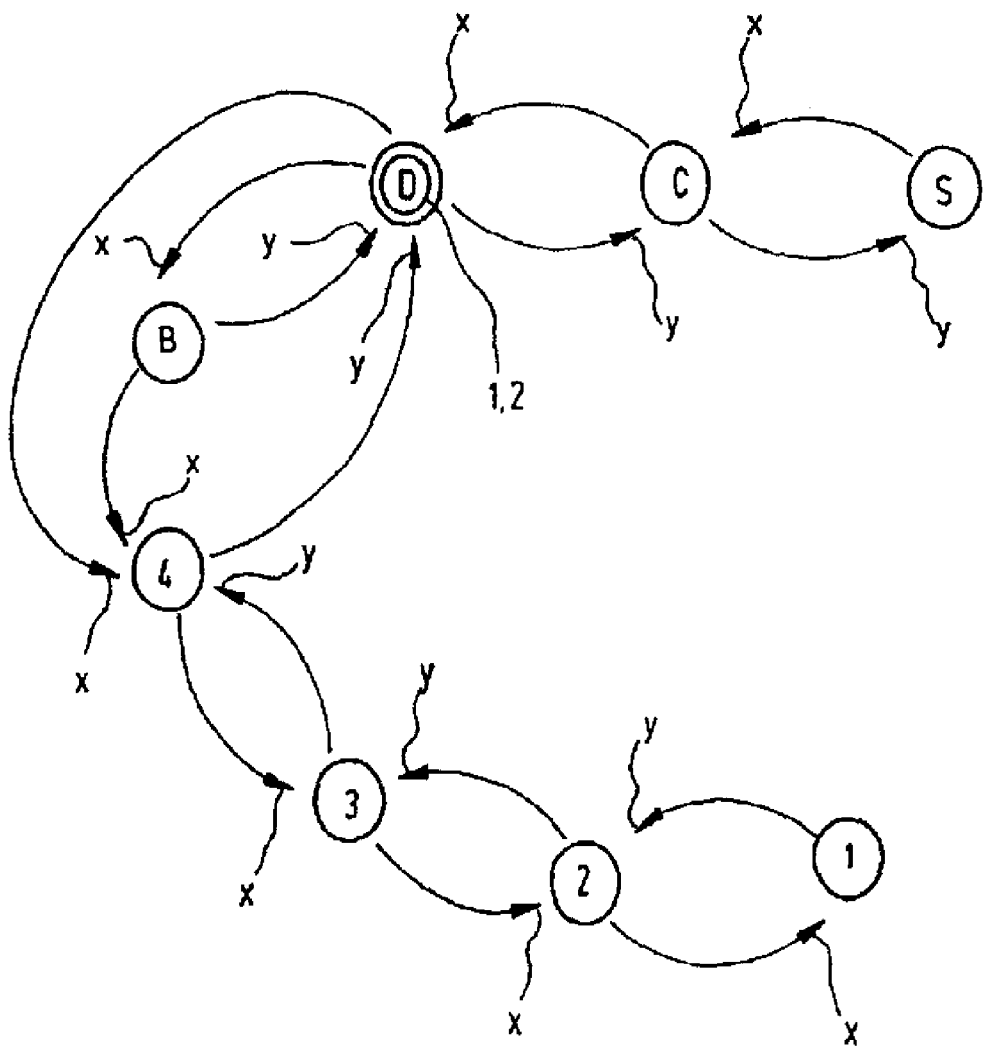
Figure 2:
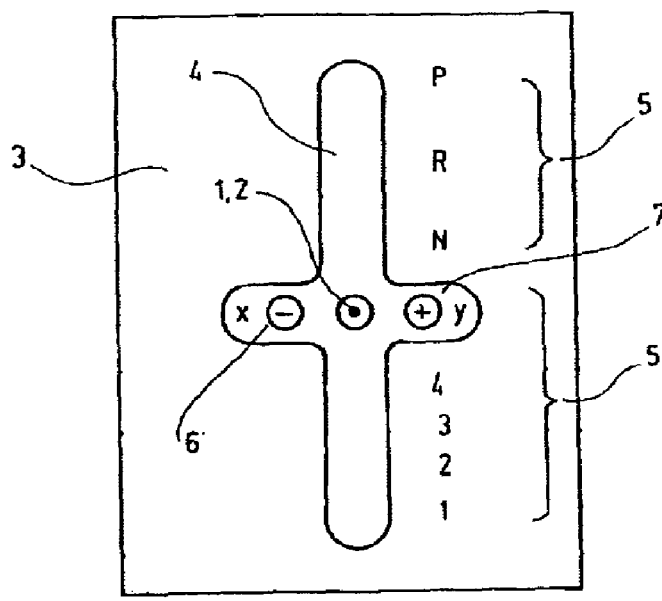
Figure 3:
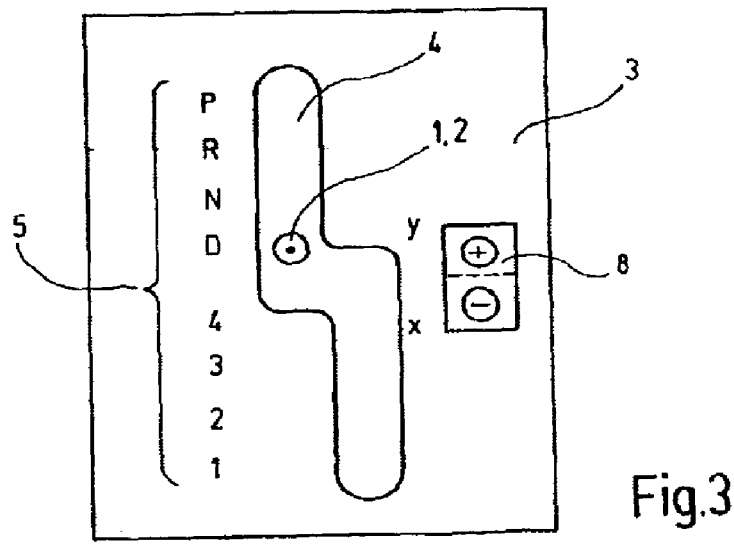

In the operator control system for activating operating modes B, C or S according to FIG. 3, a gearshift lever gutter 4 is again assumed, disposed in center console 3, in which selector lever 1, constructed as electronic selector lever 2, is guided. After the system start-up, electronic selector lever 2 is again in the permanent position for forward gear D according to shift-position indicator 5 here, as well. To now perform an action x or y necessary for the purpose of activating one of operating modes B, C or S, electronic selector lever 2 is in operative connection with a rocker key 8, arranged in center console 3, which is provided with a reset that is known per se and is not further depicted.

At this point, regardless of whether the operator control system for controlling the trailing throttle of automotive drives according to FIG. 2 or according to FIG. 3 is used, after the system start-up and the position of electronic selector lever 2 is in the permanent position for forward gear D, according to the state diagram in FIG. 1, operating modes B, C or S may be activated by the driver by performance of one of the actions x or y by way of electronic selector lever 2.

If, now, starting from the permanent position for forward gear D of electronic selector lever 2, action y is performed, then operating mode C is activated. By performing a further action y, operating mode S is activated. Should, according to the requirements, a transition from operating mode S to operating mode C, or from it to the permanent position for forward gear D be expedient, then a corresponding activation is in each case effected by execution of action x.

However, from the permanent position for forward gear D, a transition may also be performed to operating mode B, or alternatively, to one of gear positions 4, 3, 2 or 1. If an activation of operating mode B is provided, which is the case when the vehicle is in overrun, then this activation is effected by performing an action x. If a transition from operating mode B to the permanent position for forward gear D is necessary, operating mode B is activated by carrying out an action y. However, it is also possible to pass from operating mode B to, for example, gear position 4, which is made possible by performing a further action x.

If a transition from the permanent position for forward gear D to, for example, gear position 4 is to be performed, which occurs when the vehicle is not in overrun, then an action x is performed out for that purpose. By performing an action y, a transition is effected from gear position 4 to the permanent position for forward gear D. Finally, the transition between gear positions 4, 3, 2, 1 is implemented by performing actions x or y.

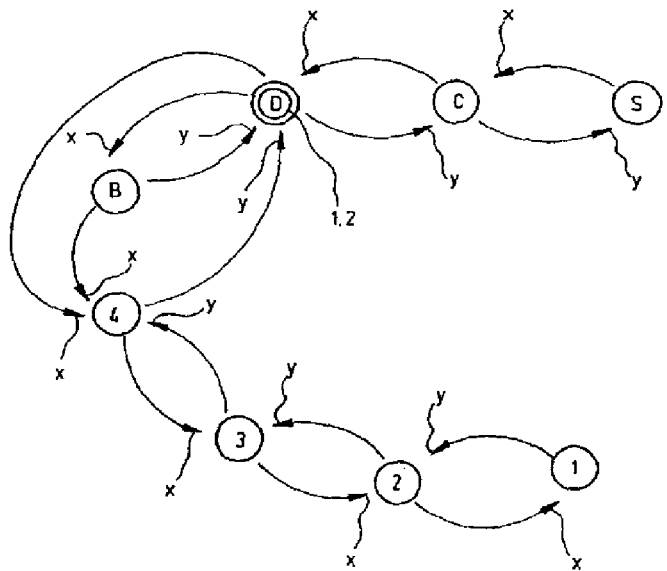

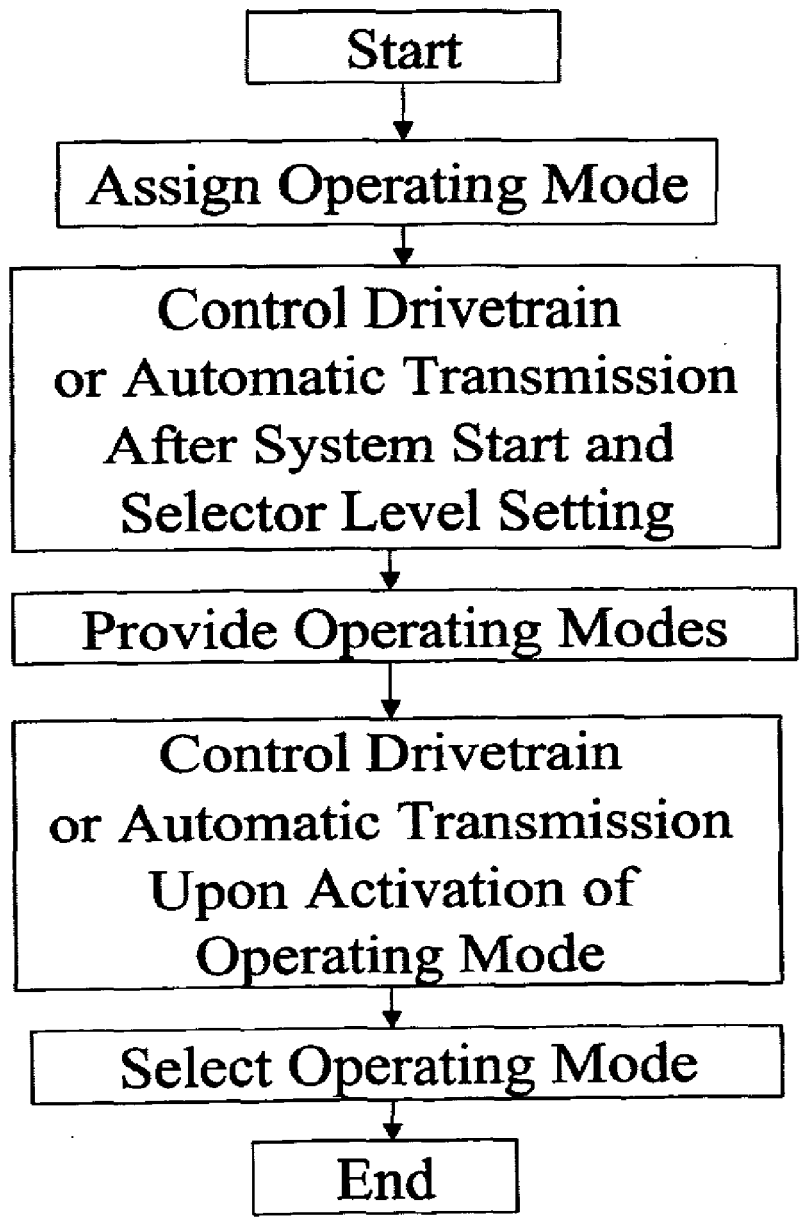

What is claimed is:

1. A method for controlling a trailing throttle of an automotive drive corresponding to an automatic transmission in operative connection with a selector lever operated by a driver and having a control equipped with a plurality of shift programs, in which a selection of one of the shift programs is done automatically as a function of an accelerator actuation, the method comprising:

assigning an operating mode to a specific range of a drag torque for a selection of factors influencing the drag torque of the automotive drive of a vehicle and for one of a drivetrain control of the vehicle and a transmission-shift control of a transmission;

performing, after system start-up and a setting of the selector lever in a permanent position for a forward gear D, steps for controlling one of a drivetrain and the automatic transmission according to a demanded drag torque and a coasting operation;

providing a plurality of operating modes including increased drag torque operating mode B for "brake", low drag torque operating mode C for "cruise" and coasting operation mode S for "surf" for the selection of factors influencing the drag, torque and the coasting operation;

controlling one of the drivetrain and the transmission upon an activation of at least one of the plurality of operating modes by the driver in the permanent position for the forward gear D of the selector lever; and selecting one of the operating mode B, the operating mode C, and the operating mode S by the driver.

2. The method according to claim 1, wherein in the operating mode with increased drag torque B, the method further comprises:

feeding of electrical energy into at least one of a vehicle electrical system and into a battery by at least one electric machine which are connected to the automotive drive of the vehicle;

changing a valve timing in a system for electronic valve timing of an internal combustion engine to increase the drag torque; and switching-in an auxiliary system including an air-conditioner compressor.

3. The method according to claim 2, further comprising:

setting a small conversion ratio when the operating mode with increased drag torque B is activated for the vehicle having a CVT.

4. The method according to claim 2, further comprising:

switching in cylinders of the internal combustion engine when the operating mode with increased drag torque B is activated in a case of a variable cylinder number using the operating mode with increased drag torque B.

5. The method according to claim 1, wherein upon activation of the operating mode with low drag torque C, performing the following steps one of individually and in combination for controlling one of the drivetrain and the automatic transmission:

setting one of a high gear for a manually-shifted transmission, and a large conversion ratio for the vehicle having CVT;

partially decoupling an internal combustion engine from an output when working with a dual-electro transmission by suitable adjustment of a support torque of an electric machine;

changing a valve timing in a system for electronic valve timing of the internal combustion engine to reduce the drag torque; and shutting down an auxiliary system including an air-conditioner compressor.

6. The method according to claim 5, further comprising:

additionally switching off cylinders of the internal combustion engine as a further step for the control in a case of variable cylinder number, upon activation, of the operating mode with low drag torque C.

7. The method according to claim 1, wherein upon activation of the operating mode for coasting operation S, performing the following steps one of individually and in combination for controlling one of the drivetrain and the automatic transmission:

one of deselecting of the forward gear and disengaging of a clutch for the vehicle having one of an automatic multi-speed gearbox and auto shift gearbox (ASG);

completely decoupling an internal combustion engine from an output when working with a dual-electro transmission by suitable adjustment of a support torque of an electric machine;

switching off the internal combustion engine;

changing a valve timing in a system for electronic valve timing of the internal combustion engine to reduce the drag torque; and shutting down of an auxiliary system including the air-conditioner compressor.

8. The method according to claim 1, wherein the selected operating mode is selected using one of an electronic selector lever, a rocker key, and a touch key.

9. The method according to claim 1,
wherein one of the operating mode B, the operating mode C, and the operating mode S is selected by a speech input by the driver.

10. The method according to claim 8, further comprising:
for selecting one of the operating mode with increased drag torque B, the operating mode with low drag torque C, and the operating mode for the coasting operation S, in the permanent position for the forward gear D, allowing a performance of two actions x and y for the driver upon actuation of one of the electronic selector lever, the rocker key, and the touch key, wherein each of the two actions are used at least for activating one of the operating mode B, the operating mode C, and the operating mode S.

11. The method according to claim 10, further comprising:
activating at least two of the operating mode B, the operating mode C, and the operating mode S when one of the actions x and y is performed twice.

12. The method according to claim 11, further comprising:
limiting one of gears 4, 3, 2 and 1 specific to a five-speed transmission upon a performance of one of the actions x and y when the vehicle is not in overrun.

* * * * *

UNITED STATES PATENT AND TRADEMARK OFFICE
CERTIFICATE OF CORRECTION

PATENT NO.    : 6,849,029 B2
DATED         : February 1, 2005
INVENTOR(S)   : Juergen Loeffler It is certified that error appears in the above-identified patent and that said Letters Patent is hereby corrected as shown below:

The title page showing illustrative figure, should be deleted and substitute therefor the attached page.

Delete Drawings sheet 1-2 and substitute therefor the Drawing sheets consisting of figure 1-4 as shown on the attached pages.

Signed and Sealed this

Twenty-fourth Day of May, 2005

JON W. DUDAS
*Director of the United States Patent and Trademark Office*

(12) United States Patent
Loeffler

(10) Patent No.: US 6,849,029 B2
(45) Date of Patent: Feb. 1, 2005

(54) METHOD AND OPERATOR CONTROL SYSTEM FOR CONTROLLING THE TRAILING THROTTLE OF AUTOMOTIVE DRIVES

(75) Inventor: Juergen Loeffler, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/316,670

(22) Filed: Dec. 11, 2002

(65) Prior Publication Data

US 2003/0119626 A1 Jun. 26, 2003

(30) Foreign Application Priority Data

Dec. 11, 2001 (DE) ......................... 101 60 819

(51) Int. Cl.$^7$ .............................................. B60K 41/04
(52) U.S. Cl. ............................................. 477/107
(58) Field of Search ........................... 477/107, 110, 477/97, 118, 119; 701/55, 56; 71/55, 56

(56) References Cited

U.S. PATENT DOCUMENTS 6,059,686 A  5/2000  Takahashi

FOREIGN PATENT DOCUMENTS

DE  695 11 944  5/2000
JP  11 230 322  8/1999

*Primary Examiner*—Dirk Wright
(74) *Attorney, Agent, or Firm*—Kenyon & Kenyon

(57) ABSTRACT

Given a method for controlling the trailing throttle of automotive drives, in which, assuming an automatic transmission whose control is equipped with various shift programs, the specific shift program being selected automatically as a function of the actuation of the accelerator and the transmission being in operative connection with a selector lever to be operated by the driver, for the selection of factors influencing the drag torque of the automotive drive and therefore for the drivetrain control or transmission-shift control, a specific range of a drag torque is assigned an operating mode, in which, after the system start-up and the setting of the selector lever in the permanent position for forward gear D, steps for controlling the drivetrain or the transmission are carried out individually or in combination, in each case according to the drag torque demanded, but also according to the coasting operation.

12 Claims, 2 Drawing Sheets